(12) United States Patent
Harada et al.

(10) Patent No.: US 8,226,851 B2
(45) Date of Patent: Jul. 24, 2012

(54) LIQUID-CRYSTALLINE POLYMER COMPOSITION CONTAINING NANOSTRUCTURED HOLLOW-CARBON MATERIAL AND MOLDED ARTICLE THEREOF

(75) Inventors: Hiroshi Harada, Tsukuba (JP); Hirokazu Matsui, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 12/472,528

(22) Filed: May 27, 2009

(65) Prior Publication Data
US 2009/0294729 A1 Dec. 3, 2009

(30) Foreign Application Priority Data

May 29, 2008 (JP) ................................. 2008-140564

(51) Int. Cl.
*C09K 19/00* (2006.01)
*C09K 19/06* (2006.01)
*C09K 19/52* (2006.01)
*B60C 1/00* (2006.01)

(52) U.S. Cl. ...... 252/299.01; 428/1.1; 430/20; 524/495; 349/1; 349/56; 349/86

(58) Field of Classification Search ............. 252/299.01, 252/299.1; 428/1.1; 430/20; 349/1, 56, 349/86
See application file for complete search history.

(56) References Cited

U.S. PATENT DOCUMENTS

| 5,428,100 A | 6/1995 | Asai et al. |
| 7,079,405 B2 * | 7/2006 | Tobita et al. ................. 363/21.1 |
| 7,189,778 B2 * | 3/2007 | Tobita et al. ................. 524/495 |
| 2004/0256599 A1 | 12/2004 | Ueno et al. |
| 2010/0133481 A1 * | 6/2010 | Zhou et al. .................... 252/511 |

FOREIGN PATENT DOCUMENTS

| EP | 0970981 A1 | 1/2000 |
| JP | 08067771 A | 3/1996 |
| JP | 2000053849 A | 2/2000 |
| JP | 2006186122 A | 7/2006 |

* cited by examiner

*Primary Examiner* — Geraldina Visconti
(74) *Attorney, Agent, or Firm* — Panitch Schwarze Belisario & Nadel LLP

(57) ABSTRACT

The present invention comprises a liquid-crystalline polymer composition comprising a nanostructured hollow-carbon material and a liquid-crystalline polymer. The nanostructured hollow-carbon material may comprises particles, each particle of which is selected from the group consisting of a particle which is composed of a carbon part and a hollow part and has a structure that the hollow part is entirely enclosed by the carbon part; and a particle which is composed of a carbon part and a hollow part and has a structure that the hollow part is partly enclosed by the carbon part.

3 Claims, 1 Drawing Sheet

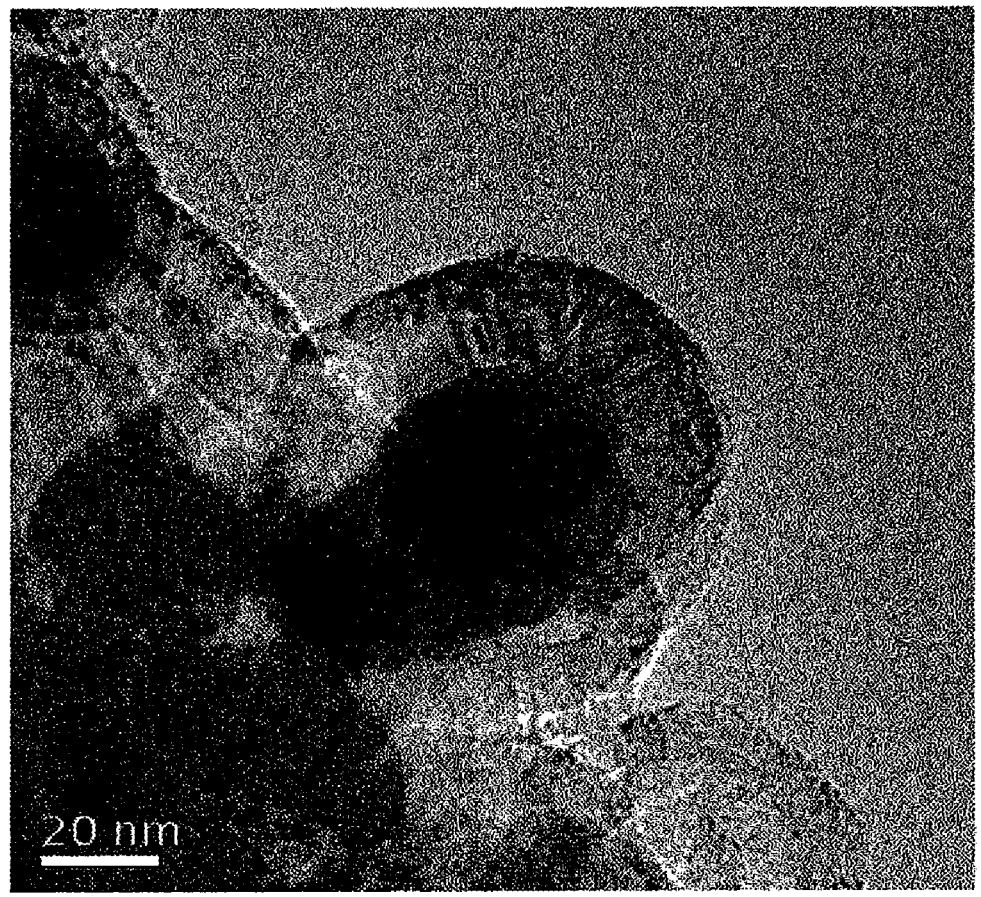

LIQUID-CRYSTALLINE POLYMER COMPOSITION CONTAINING NANOSTRUCTURED HOLLOW-CARBON MATERIAL AND MOLDED ARTICLE THEREOF

BACKGROUND OF THE INVENTION

1. Field of the Invention

Present invention relates to a C polymer composition containing a nanostructured hollow-carbon material and a liquid-crystalline polymer, and to a molded article thereof.

2. Description of Related Art

It has been known that a liquid-crystalline polymer has excellent heat-resistant property, mechanical strength, and electrical property (e.g. dielectric property). In recent years, by taking advantage of such properties, he liquid-crystalline polymer has been used as a highly functional polymer material (engineering material) which can replace metals and ceramics in various fields such as electrics, electronics, machinery, automobile, aircraft, and medical services, and particularly, has been known as a material suitable electrical and electronic parts having for thin portions or complicated shapes.

However, in the case of melt-molding the liquid-crystalline polymer to obtain a molded article (useful for a part) which is a long object, warping sometimes occurs along a longitudinal direction of the molded article. Also, in the case where the molded article has a flat shape, there is the tendency that the warping easily occurs. Since there is increasing demands for much more reductions in thickness and size as well as more complicated shape due to the trend in recent electrical and electronic parts toward reductions in weight, thickness, and size, the warping is more easily generated in the molded articles having such shapes, and the generated warping tends to cause adverse effects on properties of the parts. Therefore, in producing electric and electronic parts by using the liquid-crystalline polymer, achievement of low warping of a molded article to be obtained is an important issue.

Various factors have been suggested as the cause for the generation of the warping in molded articles. One of them is a polydomain (liquid-crystalline phase) having a liquid-crystalline state without entanglement even in a molten state, which is easily formed due to rigid molecules of the liquid-crystalline polymer. The polydomain has a behavior that molecular chains are prominently oriented toward a direction of a flow due to shearing in molding, which may result in generating the warping. Namely, in the case of melt-molding (e.g. injection molding) the liquid-crystalline polymer or the composition containing liquid-crystalline polymer, it is assumed that the warping is easily generated since the prominent orientation of the liquid-crystalline polymer in the flow direction of the molten product (hereinafter sometimes referred to as "MD") causes a considerable large difference in shrinkage between MD and a direction perpendicular to MD (hereinafter sometimes referred to s "TD"), i.e. large anisotropy of mold shrinkage rate (see, JP-A-2000-53849). JP-A-2000-53849 discloses that it is possible to obtain a molded article that is improved in warping by reducing the anisotropy by mixing a polyester-based thermoplastic elastomer with a thermotropic liquid-crystalline polymer. Also, JP-A-2006-186122 discloses that the anisotropy of mold shrinkage rate in a case for accommodating solid-state imaging device if the case is made from a liquid-crystalline polymer composition comprising a liquid-crystalline polymer and a filler (filler made from inorganic material) such as an inorganic plate-like filler or an inorganic needle-like filler; and discloses that the case is sufficiently suppressed in warping and is excellent in heat conductivity.

SUMMARY OF THE INVENTION

However, in JP-A-2000-53849, properties such as heat resistance of the liquid-crystalline polymer itself are subject to deterioration due to the mixing with the polyester-based thermoplastic elastomer. In JP-A-2006-186122, the liquid-crystalline polymer composition may contain a relatively large amount of fillers. Therefore, a liquid-crystalline polymer composition which contains a relatively small amount of filler to be used, but is capable of providing a molded article with reduced anisotropy reduction, has been a long-felt need.

Therefore, one of objects of the present invention is to provide a liquid-crystalline polymer composition which can provide a molded article having sufficiently reduced anisotropy of mold shrinkage rate in melt-molding, while using a little amount of or no fillers and sufficiently maintaining excellent properties of the liquid-crystalline polymer.

The inventors have conducted extensive research in order to solve the above-described problems to accomplish the present invention.

That is, the present invention comprises a liquid-crystalline polymer composition comprising a nanostructured hollow-carbon material and a liquid-crystalline polymer.

The liquid-crystalline polymer composition of the present invention is sufficiently reduced in anisotropy of mold shrinkage rate while sufficiently maintaining properties of the liquid-crystalline polymer. Also, the liquid-crystalline polymer composition reduced in anisotropy of mold shrinkage rate is effective for providing a molded article reduced in anisotropy with regard to mechanical properties and electrical properties.

The liquid-crystalline polymer composition of the present invention is particularly effective for suppression of warping and improvement in dimensional accuracy in molding a molded article having a flat shape, a long molded article, or a thin and micro-structured molded article.

Also, since the liquid-crystalline polymer composition of present invention is effective for anisotropy reduction with a relatively small amount of filler to be used, the liquid-crystalline polymer composition has the advantage of not requiring a considerable increase in specific gravity of a molded article to be obtained as compared to the filler made from inorganic material which has predominantly been used in the conventional example.

Since the liquid-crystalline polymer composition of present invention not only enables sufficient suppression in warping in electric and electronic parts that are required to be lightweight, thin, and small in size due to significant concern for low environmental load but also contributes to provision of more lightweight parts, the liquid-crystalline polymer composition is remarkably useful in industrial fields.

BRIEF DESCRIPTION OF THE DRAWING

FIG. 1 is a diagram showing a picture obtained by TEM observation of a nanostructured hollow-carbon material obtained in Production Example 1.

DETAILED DESCRIPTION OF THE PREFERRED EMBODIMENTS

The present invention provides a liquid-crystalline polymer composition containing a nanostructured hollow-carbon material and a liquid-crystalline polymer as well as a molded article thereof.

Hereinafter, components forming the liquid-crystalline polymer composition of present invention, a production method for the liquid-crystalline polymer composition, and the molded article made from the liquid-crystalline polymer composition will be described in this order.

<Nanostructured Hollow-Carbon Material>

The nanostructured hollow-carbon material is characterized by being nano-sized (about 0.5 nm to about 1 μm) and having a carbon part and a hollow part. For example, the nanostructured hollow-carbon material may comprise a hollow, spherical carbon particle with an outer size of from about 0.5 nm to about 1,000 nm.

When the nanostructured hollow-carbon material comprises particles having a spherical shape, the outer size of the sphere may be preferably in the range of from about 0.5 nm to about 1,000 nm, is preferably in the range of from about 1 nm to about 500 nm, is more preferably in the range of from about 10 nm to about 200 nm, and is most preferably in the range of from about 50 nm to about 100 nm.

In order to further enhance the effects of present invention, it is preferable that the nanostructured hollow-carbon material meet the following requirement (A), and it is more preferable that the nanostructured hollow-carbon material further meet (B), (C), and (D) described below.

(A) the nanostructured hollow-carbon material comprises particles, each particle of which is selected from the group consisting of:

a particle which is composed of a carbon part and a hollow part and has a structure that the hollow part is entirely enclosed by the carbon part; and a particle which is composed of a carbon part and a hollow part and has a structure that the hollow part is partly enclosed by the carbon part.

(B) The carbon part of the nanostructured hollow-carbon material has a multilayer structure that is formed of 2 to 1000 layers.

(C) A thickness of the carbon part of the nanostructured hollow-carbon material is within a range of from 1 to 200 nm.

(D) A diameter of the hollow part of the nanostructured hollow-carbon material is within a range of from 0.5 to 900 nm.

The layer forming the multilayer structure of the carbon part in (C) is a carbon atom layer having a thickness of one carbon atom.

As one preferred embodiment, such nanostructured hollow-carbon material is obtainable by a production method including the following (1), (2), (3), and (4) steps in this order.

(1) A step for producing template catalyst nanoparticles.

(2) A step for forming a carbon material intermediate on surfaces of the nanoparticles by performing polymerization of a carbon material precursor in the presence of the template catalyst nanoparticles.

(3) A step for producing a nanostructured composite material by forming a carbon material by carbonizing the carbon material intermediate.

(4) A step for producing the nanostructured hollow-carbon material by removing the template catalyst nanoparticles from the nanostructured composite material.

Specific descriptions of steps (1), (2), (3), and (4) are given below.

In Step (1), the template catalyst nanoparticles are produced as follows.

One or a plurality of types of catalyst precursor and one or a plurality of types of dispersant are used for a reaction or a bonding between the catalyst precursor and the dispersant to form a catalyst composite. In general, the catalyst and the dispersant are dissolved (the obtained solution is used as a catalyst solution) or dispersed (the obtained dispersion solution is used as a catalyst suspension) into an appropriate solvent, and the catalyst composite catalyst (nanoparticles) is formed by the bonding between the catalyst precursor and the dispersant.

Though the catalyst precursor is not particularly limited insofar as the catalyst precursor promotes polymerization of the carbon material precursor and/or carbonization of the carbon material intermediate described later in this specification, the catalyst precursor may preferably be a transition metal such as iron, cobalt, and nickel, more preferably iron.

The catalyst solution or the catalyst suspension containing the catalyst composite contains one or a plurality of types of dispersant as described above. The dispersant is selected from those capable of promoting generation of catalyst nanoparticles having desired stability (solution stability or dispersion stability), size, and uniformity. The optimum dispersant can be selected from various organic molecules, polymers, oligomers, and the like depending on the type of the solvent to be used for preparation of the catalyst solution or the catalyst suspension. In the catalyst suspension, the catalyst composite is considered to be enclosed by solvent molecules and in the form of being comprised of the catalyst precursor and the dispersant.

Various solvents including water and organic solvents may be used as the solvent for preparing the catalyst solution or the catalyst suspension. The use of the solvent is for the purpose of interaction between the catalyst precursor and the dispersant, and, depending on the type of the solvent, the solvent can function also as the dispersant. Examples of a preferred solvent include water, methanol, ethanol, n-propanol, isopropyl alcohol, acetonitrile, acetone, tetrahydrofuran, ethyleneglycol, dimethylformamide, dimethylsulfoxide, methylene chloride, and the like, and these may be mixed in use.

The catalyst composite may be obtained by removing the solvent by drying or the like after generation of the catalyst composite in the catalyst solution or the catalyst suspension. The obtained catalyst composite may be returned to a suspension by adding thereto an appropriate solvent.

The preparation method of the catalyst solution or the catalyst suspension is characterized in that solubility of the catalyst composite in the catalyst solution or dispersibility of the catalyst composite in the catalyst suspension can be controlled by changing a molar ratio between the dispersant and the catalyst precursor to be used. The molar ratio of the catalyst atom to the polar group in the dispersant may be in the range of from about 0.01 to 100, and is preferably in the range of from about 0.05 to 50.

The dispersant promotes formation of catalyst nanoparticles having a remarkably small and uniform particle diameter. The catalyst nanoparticles having the is size of about 1 μm or less may be formed in the presence of the dispersant. The particle diameter may be in the range of about 100 nm or less, and is more preferably in the range of about 50 nm or less. The particle diameter corresponds to the size of hollow part of the resulting nanostructured hollow-carbon material. That is, the diameter of the size of hollow part of the resulting nanostructured hollow-carbon material may be in the range of about 100 nm or less, and is more preferably in the range of about 50 nm or less.

An additive other than the dispersant for the catalyst solution or the catalyst suspension may be used in order to promote formation of the catalyst nanoparticles. Examples of the additive include an inorganic acid, a basic compound, and the like. More specifically, examples of the inorganic acid include hydrochloric acid, nitric acid, sulfuric acid, phosphoric acid, and the like, and examples of the basic compound include sodium hydroxide, potassium hydroxide, calcium hydroxide, ammonium hydroxide, and the like. Particularly, the basic compound (for example, an aqueous ammonium solution may be used) may preferably be added in order to adjust pH to 8 to 13, and it is more preferable to add the basic compound so as to achieve pH of 10 to 11. Since there is a tendency that the catalyst precursor is subject to fine division at a high pH value, the addition of the basic compound influences on the particle diameter of the catalyst nanoparticles.

Also, a solid substance that promotes the formation of the catalyst nanoparticles may be added. For example, an ion exchange resin or the like may be added during the catalyst nanoparticles formation. The solid substance may be removed from the finally obtained catalyst solution or the catalyst suspension by simple operation.

Typically, the catalyst solution or the catalyst suspension is prepared by mixing the catalyst precursor, the dispersant, and the additive optionally to be added for 0.5 hour to 14 days. A mixing temperature is an important factor that influences on the particle diameter of the catalyst nanoparticles and selected from 0° C. to 200° C.

For example, when using iron as the catalyst precursor, the catalyst nanoparticles containing iron may be obtained by using an iron compound such as iron chloride, iron nitrate, and iron sulfate and the dispersant in the catalyst solution or the catalyst suspension. These iron salts may be dissolved into a water-based solvent. In the catalyst nanoparticles formation by using iron salt, a byproduct is generated in some cases. Typical examples of the byproduct include a hydrogen gas, and, in the case where the hydrogen gas is generated as the byproduct, the catalyst nanoparticles are sometimes activated in the catalyst solution or during the preparation of the catalyst suspension. The catalyst nanoparticles may be subjected to a reduction treatment by using hydrogen.

Preferably, the catalyst nanoparticles are formed as a catalyst suspension in which active metal catalyst nanoparticles are present in a stably dispersed state. Due to the dispersion stability of the catalyst nanoparticles, coagulation of particles is suppressed. In the case where a part or whole of the catalyst nanoparticles is sedimented, re-suspension is easily achieved by mixing.

The catalyst nanoparticles obtained as described above are used as the template catalyst nanoparticles. The template catalyst nanoparticles have a role as a catalyst of promoting polymerization of the carbon material precursor and/or carbonization of the carbon material intermediate.

In the case of using the catalyst suspension containing catalyst nanoparticles in Step (2), the carbon material precursor is not particularly limited insofar as it does not considerably impair the dispersion state of the template catalyst nanoparticles, and the carbon material intermediate is formed on each of the surfaces of the nanoparticles by the polymerization of the carbon material precursor with the template catalyst nanoparticles being dispersed. Examples of a preferred organic material to be used as the carbon material precursor include a benzene or naphthalene derivative having one or a plurality of aromatic ring in a molecule and a functional group for polymerization. Examples of the functional group for polymerization include COOH, C=O, OH, C=C, $SO_3$, $NH_2$, N=C=O, and the like.

Preferred examples of the carbon material precursor include resorcinol, a phenol resin, a melanin-formaldehyde gel, a resorcinol-formaldehyde gel, polyfurfuryl alcohol, polyacrylonitrile, a sugar, a petroleum pitch, and the like.

The template catalyst nanoparticles are mixed with the carbon material precursor in such a manner as to generate the carbon material intermediate by the polymerization of the carbon material precursor on the surfaces. Since the template catalyst nanoparticles are catalytically active, they have a role of initiating and/or promoting the polymerization of the carbon material precursor in the vicinity of the particles.

An amount of the template catalyst nanoparticles with respect to the carbon material precursor is set so as to efficiently transform the carbon material precursor into the carbon material intermediate. Though it depends on the type of the carbon material precursor, a preferred mode of the amount of the template catalyst nanoparticles in a molar ratio between the carbon material precursor and the template catalyst nanoparticles (carbon material precursor:template catalyst nanoparticles) may be about 0.1:1 to 100:1, preferably 1:1 to 30:1. The molar ratio, the types of the catalyst nanoparticles, and the particle diameter influence on a thickness of the carbon part in a nanostructured hollow-carbon material to be obtained.

The mixture of the template catalyst nanoparticles and the carbon material precursor is sufficiently aged until the carbon material intermediate is sufficiently formed on the surfaces of the template catalyst nanoparticles. A period of time required for forming the carbon material intermediate depends on a temperature, type of catalyst, catalyst concentration, pH, and type of carbon material precursor to be used.

When adding an ammonium aqueous solution for pH adjustment, a speed of polymerization is increased and a crosslinking reaction of the carbon material precursors can proceed smoothly, which results in effectively forming the carbon material intermediate on the surfaces of the template catalyst nanoparticles.

In temperature conditions for polymerization of the carbon material precursors, preferred is 0° C. to 200° C., and more preferred is 25° C. to 120° C. In particular, in the case of using a thermal-polymerizable carbon material precursor, as the heating temperature is higher, the reaction tends to proceed.

In optimum polymerization conditions in the case of using iron particles as the template catalyst nanoparticles and forming a resorcinol-formaldehyde gel as the carbon material intermediate on the surfaces of the iron particles, a reaction temperature is 0° C. to 90° C., and a reaction time is 1 to 72 hours. In the case of using the iron particles, it is preferable to prepare the catalyst suspension in advance, and pH of the prepared catalyst suspension is selected within the range of from 1 to 14.

In Step (3), the nanostructured composite material is obtained by forming the carbon material by carbonizing the carbon material intermediate. The carbonization is ordinarily implemented by sintering, and, typically, the sintering is performed at a temperature of 500° C. to 2500° C. During the sintering, oxygen atoms and nitrogen atoms in the carbon material intermediate are released to cause re-alignment of the carbon atoms, thereby forming the carbon material. It is preferable to form the carbon material having a layered structure (multilayer structure) like graphite and a thickness of 1 to 200 nm. Note that one of the layers forming the structure of the carbon part represents a carbon atom layer having a thickness of one carbon atom as described above.

The thickness of the carbon material may preferably be 1 to 100 nm, more preferably 5 to 50 nm, and most preferably 1 to 30 nm. The number of layers can be controlled by the type of carbon material intermediate, thickness, and sintering temperature and may be within a range of 2 to 1000 layers. The thickness of the carbon part of the nanostructured hollow-carbon material may be controlled by adjusting a degree of progress of the polymerization of carbon material precursor and/or the carbonization of carbon material intermediate.

In Step (4), the template catalyst nanoparticles are removed from the nanostructured composite material to obtain the nanostructured hollow-carbon material. The removal of the catalyst nanoparticles may typically be performed by bringing the nanostructured composite material and acid or a base such as nitric acid, a hydrofluoric acid solution, and sodium hydroxide into contact. A treatment of contacting the nanostructured composite material and nitric acid (pentanormal nitric acid, for example) is preferred, and, more preferably, the contact treatment is performed for 3 to 6 hours by using a pentanormal nitric acid aqueous solution and heating to a temperature at which the nitric acid aqueous solution can be brought into reflux. Any method may be used for removing the template catalyst nanoparticles insofar as it does not cause to break the nano follow structure or nano structure.

In present invention, the nanostructured hollow-carbon material has peculiar shape, size, and electrical properties. Typical examples of the nanostructured hollow-carbon material include a nanostructured hollow-carbon material which comprises particles, each particle of which is selected from the group consisting of:

a particle which is composed of a carbon part and a hollow part and has a structure that the hollow part is entirely enclosed by the carbon part; and a particle which is composed of a carbon part and a hollow part and has a structure that the hollow part is partly enclosed by the carbon part.

The particle may have a substantially spherical shape having a hollow part and a shape containing at least a part of such shape. The shape may have a structure that a part of spherical shape is lacking.

Examples of the particles in the nanostructured hollow-carbon material include the particles as follows:

a particle which is composed of a carbon part and a hollow part and has a structure that the hollow part is entirely enclosed by the carbon part;

a particle which is composed of a carbon part and a hollow part and has a structure that the hollow part is partly enclosed by the carbon part;

a particle which is composed of a carbon part and at least two hollow parts and has a structure that the at least two hollow parts is entirely enclosed by the carbon part;

a particle which is composed of a carbon part and at least two hollow parts and has a structure that the at least two hollow parts is partially enclosed by the carbon part;

a particle which is composed of a carbon part and at least two hollow parts and has a structure that at least one hollow part is entirely enclosed by the carbon part, another at least one hollow part is partly enclosed by the carbon part, and the at least two hollow parts are connected with the carbon part.

It is considered that the shape and particle diameter of the particles of the nanostructured hollow-carbon material depend much on the shape and size of the template catalyst nanoparticles that are used for the production. Since the carbon material is formed around each of the template catalyst nanoparticles, the template catalyst nanoparticles influence on the shape and the particle diameter of the particles in the nanostructured hollow-carbon material as well as the shape and diameter of the hollow part.

In the nanostructured hollow-carbon material, the shape, the number of layers in the case where the carbon part has the multilayer structure, the thickness of the carbon part, and the diameter of the hollow part are measured by a transmission electron microscope (TEM). According to the production method including steps (1) to (4), the nanostructured hollow-carbon material meeting requirements (A), (B), (C), and (D) can be easily produced.

<Liquid-Crystalline Polymer>

Hereinafter, the liquid-crystalline polymer forming the liquid-crystalline polymer composition of present invention will be described. The liquid-crystalline polymer is a polymer that is capable of exhibiting optical anisotropy during melting and forms an anisotropic molten product at a temperature of 500° C. or less. The optical anisotropy can be measured by an ordinary polarization detection method using an orthogonal polarizer. The liquid-crystalline polymer is a polymer formed of molecules having an elongated and flat shape and a molecular chain having high rigidity along a long chain of the molecule (hereinafter, the molecular chain having high rigidity is sometimes referred to as "mesogenic group"), wherein the mesogenic group is present on one or both of a main chain and a side chain of the polymer, and the liquid-crystalline polymer having the mesogenic group on the polymer main chain is preferred in the case where higher heat resistance is required.

Specific examples of the liquid-crystalline polymer include liquid-crystalline polyester (hereinafter abbreviated to "polyester"), liquid-crystalline polyesteramide (hereinafter abbreviated to "polyesteramide"), liquid-crystalline polyester ether, liquid-crystalline polyester carbonate, liquid-crystalline polyesterimide, liquid-crystalline polyamide (hereinafter abbreviated to "polyamide"), and the like, and polyester, polyesteramide, or the polyamide is preferred among the above from the viewpoint of obtaining a highly strong resin molded article.

As a specific example of the preferred liquid-crystalline polymers, at least one liquid-crystalline polymer selected from the following (a), (b), and (c) is preferred.

(a) Polyester, polyesteramide, or polyamide formed of a structural unit (I) and/or a structural unit (II).

(b) Polyester or polyesteramide formed of a structural unit selected from the structural unit (I) and the structural unit (II), a structural unit (III), and a structural unit (IV).

(c) Polyester or polyesteramide formed of a structural unit selected from the structural unit (I) and the structural unit (II), the structural unit (III), and a structural unit selected from the structural unit (IV), a structural unit (V), and a structural unit (VI).

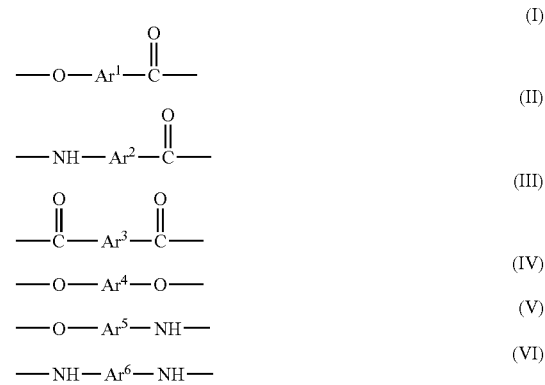

wherein each of $Ar^1$, $Ar^2$, $Ar^5$, and $Ar^6$ independently represents a divalent aromatic group; and each of $Ar^3$ and $Ar^4$ independently represents a divalent group selected from an aromatic group, an alicyclic group, and an aliphatic group. A part or whole of hydrogen atoms on an aromatic ring in the aromatic group may be substituted by a halogen atom, an alkyl group having 1 to 10 carbon atoms, an alkoxy group, or an aryl group having 6 to 10 carbon atoms. The alicyclic group means a group obtained by removing two hydrogen atoms from an alicyclic compound, and the aliphatic group means a group obtained by removing two hydrogen atoms from an aliphatic compound.

In the structural units, the aromatic group represented by $Ar^1$, $Ar^2$, $Ar^5$, and $Ar^6$ may be a group obtained by removing two hydrogen atoms bonded to an aromatic ring of an aromatic compound selected from the group consisting of a monocyclic aromatic compound, condensed ring aromatic compound, and an aromatic compound in which a plurality of aromatic rings are bonded by a divalent bonding group (including a single bond), such as benzene, naphthalene, biphenylene, diphenylether, diphenylsulfone, diphenylketone, diphenylsulfide, and diphenylmethane, preferably a divalent aromatic group selected from 2,2-diphenylpropane, a 1,4-phenylene group, a 1,3-phenylene group, a 2,6-naphthalenediyl group, and a 4,4'-biphenylene group, and the liquid-crystalline polymer having the divalent aromatic group selected from such groups is preferred due to its more excellent mechanical strength.

The structural unit (I) is a structural unit derived from aromatic hydroxycarboxylic acid, and examples of the aromatic hydroxycarboxylic acid include 4-hydroxybenzoic acid, 3-hydroxybenzoic acid, 6-hydroxy-2-naphthoic acid, 7-hydroxy-2-naphthoic acid, 6-hydroxy-1-naphthoic acid, 4'-hydroxybiphenyl-4-carboxylic acid, and aromatic hydroxycarboxylic acid obtainable by substituting a part or whole of hydrogens on an aromatic ring in each of these aromatic hydroxycarboxylic acids by an alkyl group, an alkoxy group, or a halogen atom. A typical example of the alkyl group include those having 1 to 6 carbon atoms, and examples thereof include a straight chain, branched chain, or alicyclic alkyl group such as a methyl group, an ethyl group, a propyl group, an isopropyl group, a butyl group, a tert-butyl group, a hexyl group, a cyclohexyl group, and the like. Typical examples of alkoxy group include those having 1 to 6 carbon atoms, and examples thereof include a straight chain, branched chain, or alicyclic alkoxy group such as a methoxy group, an ethoxy group, a propioxy group, an isopropioxy group, a butoxy group, a tert-butoxy group, a hexyloxy group, a cyclohexyloxy group, and the like. Examples of the aryl group include a phenyl group and a naphthyl group. The halogen atom is selected from a fluorine atom, a chlorine atom, a bromine atom, and an iodine atom.

The structural unit (II) is a structural unit derived from aromatic aminocarboxylic acid, and examples of the aromatic aminocarboxylic acid include 4-aminobenzoic acid, 3-aminobenzoic acid, 6-amino-2-naphtoic acid, and those obtainable by substituting a part or whole of hydrogens on an aromatic ring in each of these aromatic aminocarboxylic acids by an alkyl group, an alkoxy group, an aryl group, or a halogen atom. The alkyl group, the alkoxy group, the aryl group, and the halogen atom are the same as those listed as the substituents of the aromatic hydroxycarboxylic acids.

The structural unit (V) is a structural unit derived from aromatic hydroxyamine, and examples thereof include 4-aminophenol, 3-aminophenol, 4-amino-1-naphthol, 4-amino-4'-hydroxydiphenyl, and those obtainable by substituting a part or whole of hydrogens on an aromatic ring in each of these aromatic hydroxyamines by an alkyl group, an alkoxy group, an aryl group, or a halogen atom. The alkyl group, the alkoxy group, the aryl group, and the halogen atom are the same as those listed as the substituents of the aromatic hydroxycarboxylic acids.

The structural unit (VI) is a structural unit derived from aromatic diamine, and examples thereof include 1,4-phenylenediamine, 1,3-phenylenediamine, 4,4'-diaminophenylsulfide (also called thiodianiline), 4,4'-diaminodiphenylsulfone, 4,4'-diaminodiphenylether(oxydianiline), those obtainable by substituting a part or whole of hydrogens on an aromatic ring in each of these aromatic diamines by an alkyl group, an alkoxy group, an aryl group, or a halogen atom, and those obtained by substituting a hydrogen atom bonded to a primary amino group in each of the aromatic diamines by an alkyl group. The alkyl group, the alkoxy group, the aryl group, and the halogen atom are the same as those listed as the substituents of the aromatic hydroxycarboxylic acids.

Each of $Ar^3$ in the structural unit (III) and $Ar^4$ in the structural unit (IV) is a group selected from the aromatic groups described in $Ar^1$, $Ar^2$, $Ar^5$, or $Ar^6$, divalent aliphatic groups obtained by removing two hydrogen atoms from a saturated aliphatic compound having 1 to 9 carbon atoms, and divalent alicyclic groups.

The structural unit (III) is a structural unit derived from aromatic dicarboxylic acid, aliphatic dicarboxylic acid or alicyclic dicarboxylic acid. Examples of the aromatic dicarboxylic acid include terephthalic acid, 4,4'-diphenyldicarboxylic acid, 4,4'-triphenyldicarboxylic acid, 2,6-naphthalenedicarboxylic acid, diphenylether-4,4'-dicarboxylic acid, isophthalic acid, diphenylether-3,3'-dicarboxylic acid, and those obtained by substituting a part or whole of hydrogens on an aromatic ring in each of these aromatic dicarboxylic acids by an alkyl group, an alkoxy group, an aryl group, or a halogen atom.

Examples of the aliphatic dicarboxylic acid include malonic acid, succinic acid, adipic acid, and those obtained by substituting a part or whole of hydrogen atoms of an aliphatic group in each of the aliphatic dicarboxylic acids by an alkyl group, an alkoxy group, an aryl group, or a halogen atom. The alkyl group, the alkoxy group, the aryl group, and the halogen atom are the same as those listed as the substituents of the aromatic hydroxycarboxylic acids.

Examples of the alicyclic dicarboxylic acid include trans-1,4-cyclohexanedicarboxylic acid, cis-1,4-cyclohexanedicarboxylic acid, 1,3-cyclohexanedicarboxylic acid, trans-1,4-(1-methyl)cyclohexanedicarboxylic acid, and those obtained by substituting a part or whole of hydrogen atoms of an alicyclic group in each of the alicyclic dicarboxylic acids by an alkyl group, an alkoxy group, an aryl group, or a halogen atom. The alkyl group, the alkoxy group, the aryl group, and the halogen atom are the same as those listed as the substituents of the aromatic hydroxycarboxylic acids.

The structural unit (IV) is a group derived from aromatic diol, aliphatic diol, or alicyclic diol. Examples of the aromatic diol include hydroquinone, resorcin, naphthalene-2,6-diol-4,4'-biphenylenediol, 3,3'-biphenylenediol, 4,4'-dihydroxydiphenylether, 4,4'-dihydroxydiphenylsulfone, and those obtained by substituting a part or whole of hydrogens on an aromatic ring in each of these aromatic diols by an alkyl group, an alkoxy group, an aryl group, or a halogen atom.

Examples of the aliphatic diol include ethyleneglycol, propyleneglycol, butylenediol, neopentylglycol, and those obtained by substituting a part or whole of hydrogen atoms of an aliphatic group in each of these aliphatic diols by an alkyl group, an alkoxy group, an aryl group, or a halogen atom. It is noted that the alkyl group, the alkoxy group, the aryl group, and the halogen atom are the same as those listed as the substituents of the aromatic hydroxycarboxylic acids.

Examples of the alicyclic diol include 1,6-hexanediol, trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol, trans-1,3-cyclohexanedimethanol, and those obtained by substituting a part or whole of hydrogen atoms of an alicyclic group in each of these alicyclic diols by an alkyl group, an alkoxy group, an aryl group, or a halogen atom. It is noted that the alkyl group, the alkoxy group, the aryl group, and the halogen atom are the same as those listed as the substituents of the aromatic hydroxycarboxylic acids.

In the preferred liquid-crystalline polymers, (b) or (c) sometimes has an aliphatic group and/or an alicyclic group in the structural unit (III) and/or the structural unit (IV), and an introduction amount of such aliphatic group and/or an alicyclic group to the liquid-crystalline polymer is selected within a range that enables expression of liquid-crystallinelinity of the liquid-crystalline polymer and within a range that does not considerably impair the heat resistance of the liquid-crystalline polymer. In the liquid-crystalline polymer to be used in present invention, when a sum of $Ar^1$ to $Ar^6$ is 100 mol %, a sum of the divalent aromatic groups is preferably 60 mol %, more preferably 75 mol %, yet more preferably 90 mol %, and particularly preferably 100 mol % (wholly aromatic liquid-crystalline polymer).

Among the preferred wholly aromatic liquid-crystalline polymers, polyester in (a) or polyester in (b) is preferred, and polyester in (b) is particularly preferred. Among the preferred polyesters, polyester formed of a structural unit derived from aromatic hydroxycarboxylic acid of (I-1) and/or (I-2) described below, a structural unit derived from at least one aromatic dicarboxylic acid selected from (III-1), (III-2), and (III-3) described below, and a structural unit derived from at least one aromatic diol selected from (IV-1), (IV-2), (IV-3), and (IV-4) has the advantage of easily obtaining a molded article having high levels of properties such as moldability, heat resistance, high mechanical strength, and flame resistance.

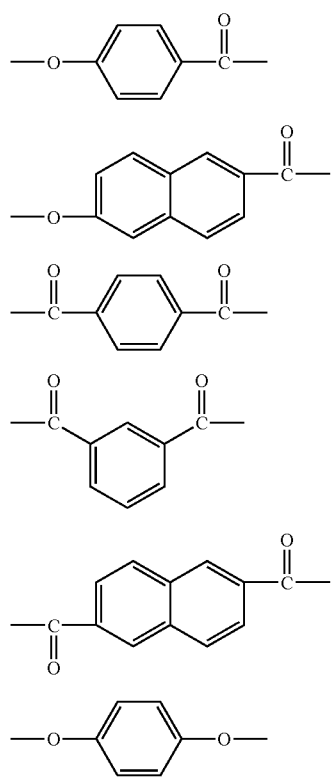

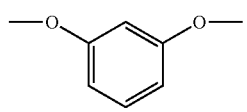

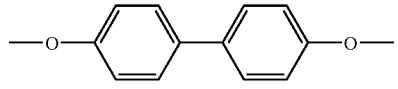

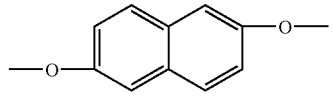

Hereinafter, a method for producing the liquid-crystalline polymer will be described.

The liquid-crystalline polymer may be obtained by polymerizing monomers in a known polymerization method. The polymerization may be conducted by using as the monomere(s):

aromatic hydroxycarboxylic acid or aromatic aminocarboxylic acid as a monomer with regard to (a);

at least one of aromatic hydroxycarboxylic acid or aromatic aminocarboxylic acid, at least one of aromatic dicarboxylic acid or aliphatic dicarboxylic acid or an alicyclic dicarboxylic acid, and at least one of aromatic diol or aliphatic diol or aliphatic diol as monomers with regard to (b);

at least one of aromatic hydroxycarboxylic acid or aromatic aminocarboxylic acid, at least one of aromatic dicarboxylic acid or aliphatic dicarboxylic acid or alicyclic dicarboxylic acid and at least one compound selected from aromatic diol, aliphatic diol, alicyclic diol, aromatic hydroxyamine and aromatic diamine as monomers with regard to (c).

Polyester that is the more preferred liquid-crystalline polymer is obtainable by performing the polymerization by using aromatic hydroxycarboxylic acid, aromatic dicarboxylic acid, and aromatic diol as monomers in polyester of (b).

In the production of the liquid-crystalline polymer, the monomer may directly be polymerized, but it is preferable to use an ester-forming derivative and an amide-forming derivative (hereinafter collectively referred to as ester/amide-forming derivative in some cases) from the viewpoint of facilitating the polymerization. The ester/amide-forming derivative means a monomer having a group promoting an ester generation reaction or an amide generation reaction, and specific examples thereof include an ester/amide-forming derivative obtained by transforming a carboxylic group in a monomer molecule into a haloformyl group, an anhydride, or ester, an ester/amide-forming derivative obtained by changing a phenolic hydroxide group and an amino group in a monomer molecule into an ester group and an amide group, and the like.

A production method for polyester in (b), which is most preferred among the liquid-crystalline polymers, will be described in detail. Such polyester can be produced by a method disclosed in JP-2002-146003 or the like, and the method disclosed in the publication will be briefly described. An anhydride, preferably acetic anhydride, is used to obtain an acylated substance obtained by transforming phenolic hydroxide groups in aromatic hydroxycarboxylic acid and aromatic diol into acyloxy groups, and a acetic acid-removing reaction between the acyloxy groups of the acylated substance and carboxylic groups of acylated aromatic hydroxycarboxylic acid and aromatic dicarboxylic acid is caused by ester exchange, thereby producing polyester. The ester-forming derivative obtained by the acylation can be easily polymerized by an acetic acid-removing polycondensation. More preferably, the acylated compound and aromatic dicarboxylic acid are subjected to melt polymerization at a reaction temperature of 150° C. to 400° C. for a reaction time of 0.5 to 8 hours to obtain a relatively low molecular weight polymer (hereinafter referred to as "prepolymer"), and the prepolymer is made into a powder, followed by solid polymerization by heating, thereby obtaining polyester. Such solid polymerization is preferred since the polymerization is further progressed by the solid polymerization to achieve a high molecular weight of polyester.

In the liquid-crystalline polymer composition of present invention, the amount of the nanostructured hollow-carbon material to be used may preferably be within a range of 0.01 to 900 parts by weight with respect to 100 parts by weight of the liquid-crystalline polymer. When the amount of the nanostructured hollow-carbon material is less than 0.01 parts by weight, the effect of reducing anisotropy of mold shrinkage rate is hardly exhibited. In contrast, when the amount of the nanostructured hollow-carbon material exceeds 900 parts by weight, moldability of the liquid-crystalline composition is easily deteriorated, so that a molded article to be obtained can be subject to reduction in mechanical strength and can be fragile. Since a specific gravity of a molded article to be obtained is reduced along an increase in use amount of the nanostructured hollow-carbon material according to the liquid-crystalline polymer composition of present invention, a further reduction in weight of the molded article can be achieved.

The use amount of the nanostructured hollow-carbon material forming the liquid-crystalline polymer composition with respect to 100 parts by weight of the liquid-crystalline polymer in present invention may preferably be 0.1 to 250 parts by weight, more preferably 0.2 to 125 parts by weight, further preferably 0.5 to 70 parts by weight, in view of a balance between moldability and other properties. Also, even when the use amount of the nanostructured hollow-carbon material is reduced, generation of warping of the resulting molded article can be suppressed by suppressing anisotropy of mold shrinkage rate of the composition containing such an amount of the nanostructured hollow-carbon material. In order to reduce the anisotropy of mold shrinkage rate without effecting on a molded article specific gravity so much, 0.5 to 30 parts by weight of the nanostructured hollow-carbon material with respect to 100 parts by weight of the liquid-crystalline polymer is sufficient, and even 0.5 to 10 parts by weight of the nanostructured hollow-carbon material can reduce the anisotropy. As described above, the use amount of the nanostructured hollow-carbon material is appropriately optimized by taking the reduction in specific gravity and the balance between the reduction in anisotropy and other properties into consideration in addition to the reduction in anisotropy.

In the liquid-crystalline polymer composition of present invention, the mechanism that the presence of the nanostructured hollow-carbon material contributes to the reduction in anisotropy of mold shrinkage rate of the composition is not exactly clarified. However, the inventors have assumed as follows. That is, when a molded article is obtained by melt molding a composition containing the liquid-crystalline polymer, a layer in which a liquid-crystalline polymer is highly molecularly oriented, which is ordinarily called a skin layer, is formed on a surface of the molded article. In the skin layer, since an orientation degree of the liquid-crystalline polymer is particularly high, the liquid-crystalline polymer greatly contributes to the expression of anisotropy of mold shrinkage rate of the composition. Since the nanostructured hollow-carbon material has the nano-sized particle diameter which is relatively small, and since each of particles thereof has a small specific gravity, many of the particles tend to be present in the skin layer in the molded article to reduce the orientation degree of the skin layer thereby reducing the anisotropy of mold shrinkage rate.

Also, as compared to a glass balloon that has heretofore been known as a filler for the liquid-crystalline polymer, the nanostructured hollow-carbon material is remarkably useful for obtaining a molded article which is lightweight. Since the nanostructured hollow-carbon material has a diameter that is considerably smaller than that of the glass balloon and a large carbon part curvature, it has high strength against breakage. Further, since the material of the nanostructured hollow-carbon material is the carbon material, the nanostructured hollow-carbon material is capable of reducing a hollow ratio as compared to the glass balloon which has substantially the same specific gravity and is made from a glass. Breakage and the like of the filler (nanostructured hollow-carbon material) can be suppressed during the melt molding with the use of a hollow material having a reduced hollow ratio. In such a case, a lower specific gravity of the molded article can be attained because of easily maintaining the hollow structure by the filler in the molded article.

The liquid-crystalline polymer composition of present invention has the advantages of sufficiently reducing the anisotropy of mold shrinkage rate of the composition and making it easy to obtain a more lightweight molded article without increasing a specific gravity of the article so much. Other fillers may be used as long as not considerably impair the advantages exhibited by the nanostructured hollow-carbon materials for the purpose of improvements in other properties such as strength, mechanical strength (for example, stiffness, impact-resistance and the like), heat-resistance (for example, deflection temperature under load and the like), and/or furthermore reducing the anisotropy of mold shrinkage rate of the composition. Examples of such filler component include a fibrous filler, a plate-like filler, a spherical filler, a powder filler, a modified filler, a whisker, a coloring component, a lubricant, a surfactant, an antioxidant, a heat stabilizer, a stabilizer, a UV absorber, an antistatic agent, and the like, and examples of the fibrous filler include a glass fiber, a PAN-based carbon fiber, a pitch-based carbon fiber, a silica alumina fiber, a silica fiber, an alumina fiber, a liquid-crystalline polymer (LCP) fiber, an aramid fiber, a polyethylene fiber, and the like. Examples of the plate-like filler include talc, mica, graphite, and wollastonite. Examples of the spherical filler include glass beads and a glass balloon. Examples of the powder filler include calcium carbonate, dolomite, clay sulfate barium, titanium oxide, carbon black, electroconductive carbon, fine silica, and the like. Examples of the modified filler include a glass flake and a modified cross-section glass fiber. These filler components may be used alone or in combination of two or more. An amount of these other fillers to be added with respect to 100 parts by weight of the liquid-crystalline polymer may preferably be 0 to 250 parts by weight, more preferably 0 to 150 parts by weight, further preferably 0 to 100 parts by weight.

Also, as long as not impair the purpose of present invention, another resin component may be contained in the liquid-crystalline polymer composition of present invention. Examples of the resin component include a thermoplastic resin such as polyamide, polyester, polyesteramide, polyphenylene sulfide, polyether ketone, polyether ether ketone, polycarbonate, polyphenylene ether, and modified substance thereof, polysulfone, polyethersulfone, and polyetherimide, and a heat curable resin such as a phenol resin, an epoxy resin, and a polyimide resin, and these may be used alone or in combination of two or more.

<Production Method for Liquid-Crystalline Polymer Composition>

The liquid-crystalline polymer composition of present invention may be produced by various ordinarily employed methods. The liquid-crystalline polymer composition may be obtained by mixing the liquid-crystalline polymer, the nanostructured hollow-carbon material, and optionally added other components with a henschel mixer or a tumbler. In general, it is also possible to obtain the liquid-crystalline polymer composition in the form of pellets (composition pellets) by heat-melting the liquid-crystalline polymer in advance and then kneading the nanostructured hollow-carbon material and optionally added other components in an extruder. Alternatively, after obtaining a mixture by mixing the liquid-crystalline polymer, the nanostructured hollow-carbon material, and optionally added other components with a henschel mixer or a tumbler, the mixture may be melt-kneaded by using an extruder to obtain composition pellets. Alternatively, the composition pellets may be obtained by a combination of the above-described methods, i.e. by mixing and dispersing a mixture of a part of the liquid-crystalline polymer and the nanostructured hollow-carbon material, and then adding the mixture to the rest of heat-molten liquid-crystalline polymer, followed by kneading in an extruder. It is preferable to obtain the composition pellets since the composition pellets are easy to handle in molding such as subsequent injection molding. It is preferable to use a biaxial kneading extruder as the extruder.

<Molding Method for Liquid-Crystalline Polymer Composition>

The liquid-crystalline polymer composition of present invention may be applied to known melt-molding methods, preferably to molding methods such as injection molding, extrusion molding, compression molding, blow molding, and vacuum molding. Also, the liquid-crystalline polymer composition is applicable to film molding using T die, film formation such as inflation molding, and melt-fiber forming.

Particularly, the liquid-crystalline polymer is applicable to molded articles of various shapes, and the injection molding is preferred from the viewpoint of capability of achieving high productivity. The injection molding will be described in detail. To start with, a flow initiation temperature FT (° C.) of the composition pellets is determined. The flow initiation temperature means a temperature at which the composition pellets are molten in a thermoplasticizer device of an injection molding apparatus. The flow initiation temperature is a temperature at which a melt viscosity becomes 4800 Pa·s (48000 poise) when the heat-molten product is extruded from a nozzle by using a capillary rheometer having a nozzle having an inner diameter of 1 mm and a length of 10 mm while heating at a heating rate of 4° C./min under a load of 9.81 MPa (100 kgf/cm$^2$). Such flow initiation temperature ordinarily depends on the type of the liquid-crystalline polymer in the liquid-crystalline polymer composition and is an index which is known in the art for indicating a molecular amount of the liquid-crystalline polymer (see Naoyuki Koide, Liquid-crystalline Polymer Synthesis, Molding, and Application, pages 95 to 105, published by CMC on Jun. 5, 1987). In present invention, as an apparatus for measuring the flow initiation temperature, a flow characteristics evaluation apparatus "flow tester CFT-500D" manufactured by Shimadzu Corporation is used.

Examples of a preferred injection molding method include a method of melting the composition pellets at a temperature that is within a range of from the flow initiation temperature FT of the composition pellets to a temperature that is higher than the flow initiation temperature by 100° C. and injection-molding into a die where a temperature is set to 0° C. or more. The composition pellets may preferably be dried before the injection molding.

When the injection molding is performed at a temperature lower than FT as the resin melting temperature, it is impossible to completely charge into a fine shape due to low fluidity, and a molded article surface can undesirably be roughened due to low transfer property to a die surface. In contrast, when the injection molding is performed at the resin melting temperature that is higher than FT+100° C., the liquid-crystalline polymer retained in the molding machine is decomposed to cause swelling of a molded article to be obtained, to give a molded article that is subject to degassing and the like, or to cause leakage of molten resin from the nozzle when taking out a molded article by opening the die after the injection molding. With the molded article subject to degassing, the gas can cause an adverse effect when applying the molded article to various parts to make it difficult to apply the molded article to various uses. In the case where the molten resin is leaked out from the nozzle when taking out the molded article by opening the die and in the case where it is difficult to obtain a molded article having a desired shape due to a so-called burr of the leaked molten resin, there is raised a problem that productivity of the molded articles is reduced due to necessity of removal of the burr in the post-processing. In view of the point of well avoiding such drawbacks and stability and moldability of the molded article to be obtained, the resin melting temperature may preferably be FT+10° C. or more to FT+80° C. or less, more preferably FT+15° C. or more to FT+60° C. or less.

The tool temperature is ordinarily set to 0° C. or more as described above, but not particularly limited, can be decided considering appearance, dimensions, and machine characteristics of molded article, and productivity such as processability and a molding cycle. In general, the tool temperature may preferably be 40° C. or more. When the tool temperature is below 40° C., control on the tool temperature becomes difficult in the case of continuous molding, and such temperature fluctuation can undesirably cause adverse effects on the molded article. More preferably, the tool temperature may be 70° C. or more. When the tool temperature is below 70° C., surface smoothness of the molded article to be obtained can be impaired. From the viewpoint of increasing the surface smoothness, a higher tool temperature is more advantageous, but a too high tool temperature is undesirable since such temperature cause problems such as a reduction in productivity due to lengthened time required for a cooling step due to a reduction in cooling effect and a deformation of a molded article due to a reduction in releasability. Further, such too high tool temperature causes bad engagement between dies to cause a drawback of breakage of the die when opening/closing the die and the like. An upper limit of the tool temperature may preferably be optimized depending on the type of composition pellets to be applied in order to prevent the decomposition of the liquid-crystalline polymer contained in the composition pellets. In the case of using wholly aromatic polyester that is the particularly preferred liquid-crystalline polymer as described above, the tool temperature may preferably be 70° C. or more to 220° C. or less, more preferably 130° C. to 200° C.

The liquid-crystalline polymer composition of present invention is suitably used for electric and electronic parts as described above. Examples of the electric and electronic parts include a connector, a socket, a relay part, a coil bobbin, an optical pickup, an oscillator, a printed wiring board, a circuit substrate, a semiconductor package, computer-related parts and the like.

The liquid-crystalline polymer composition of present invention is usable not only for production of electric and electronic parts but also for other members that are required to be reduced in weight and anisotropy of mold shrinkage rate. Examples of such members include semiconductor production process-related parts such as an IC tray and a wafer carrier; home electric appliance parts such as a VTR, a television, an iron, an air conditioner, a stereo, a cleaner, a refrigerator, a rice cooker, and an lighting equipment; lighting equipment parts such as a lamp reflector and a lamp holder; an audio product parts such as a compact disk, a laser disk, and a speaker; communication device parts such as an optical cable ferrule, a telephone part, a facsimile part, and a modem; copying machine and printer-related parts such as a separation pawl and a heater holder; machine parts such as an impeller, a fan gear, a gear, a bearing, a motor part, and casing; automobile parts such as an automobile mechanism part, an engine part, an engine room part, a wire harness part, and an interior part; cooking devices such as a microwave cooking pan and a heat resistant table ware; civil engineering materials such as heat insulating and sound insulating material including a floor material, a wall material, and the like, a supporting material including a beam, a column, and the like, a building material including a roof material, and the like; space appliances such as an aircraft and a spacecraft; members for radiation facility such as an atomic furnace; members for marine facility; washing jigs; optical appliance parts; valves; pipes; nozzles; filters; films; medical appliance parts and medical materials; sensor parts; sanitary fittings; sporting goods; and leisure goods.

The molded article obtained from the liquid-crystalline polymer composition of present invention can be used for various applications, and the molded article is particularly suitable for applications that require dimensional accuracy since the liquid-crystalline polymer composition has a small anisotropy of mold shrinkage rate.

The invention being thus described, it will be apparent that the same may be varied in many ways. Such variations are to be regarded as within the spirit and scope of the invention, and all such modifications as would be apparent to one skilled in the art are intended to be within the scope of the following claims.

EXAMPLES

The present invention is described in more detail by following Examples, which should not be construed as a limitation upon the scope of the present invention.

An evaluation method for liquid-crystalline compositions or molded articles obtained in the examples is as follows.

Mold Shrinkage Rate:

A flat mold shrinkage rate measurement test piece having a film gate having a thickness of 1 mm and a size of 64 mm×64 mm×3 mm was obtained by molding a liquid-crystalline polymer composition using an injection molding machine. Lengths of sides in a direction parallel (MD) to and a perpendicular (TD) to a flow direction of the test piece were measured, and calculation was conducted by using a ratio of a molded article dimension to a die dimension. More specifically, the mold shrinkage rate was calculated by the following expression.

Mold shrinkage rate=(die dimension−molded article dimension)/die dimension×100(%)

Specific Gravity:

As a specific gravity measurement test piece, an ASTM No. 4 dumbbell was obtained by molding a liquid-crystalline polymer composition using an injection molding apparatus.

A specific gravity of the test piece was measured in accordance with ASTM D792 (23° C.)

The same result was obtained by using a test piece having the size of 64 mm×64 mm×15 mm (thickness) and a test piece having a length of 127 mm, a width of 12.7, and a thickness of 6.4 mm in place of the ASTM No. 4 dumbbell.

Production Example 1

Production of Nanostructured Hollow-Carbon Material

A 0.1 M iron mixture solution was prepared by using 2.24 g of an iron powder, 7.70 g of citric acid, and 400 ml of water, and charged into an air tight container, followed by mixing for 7 days by using a desktop shaker. During the mixing period, a generated hydrogen gas was suitably discharged from the container to obtain a catalyst nanoparticle mixture solution. 100 ml of the catalyst nanoparticle mixture solution was added to a mixture solution of 6.10 g of resorcinol and 9.0 g of formaldehyde, and 30 ml of an ammonium aqueous solution was dropped with stirring violently. The obtained suspension had a pH level of 10.26. The suspension was subjected to aging for 3.5 hours by heating to 80° C. to 90° C. on an oil bath to provide a carbon material intermediate. The carbon material intermediate was collected by filtering, dried overnight in an oven, and then sintered for 3 hours under a nitrogen atmosphere at 1150° C. The obtained nanostructured composite material was subjected to reflux in a 5 M nitric acid solution for 6 to 8 hours and then subjected to a heat treatment in an acidic mixture solution ($H_2O/H_2SO_4/KMnO_4$=1:0.01: 0.003 (molar ratio)) at 90° C. for 3 hours. The nanostructured composite material was washed with water and dried in an oven for 3 hours to obtain 1.1 g of a nanostructured hollow-carbon material. A result of observation by a transmission electron microscope of the obtained nanostructured hollow-carbon structure is shown in FIG. 1. As a result of the TEM observation, the carbon part had a multilayer structure of 30 to 100 layers.

Production Example 2

Production of Liquid-Crystalline Polymer

To a reactor provided with a stirring device, a torque meter, a nitrogen gas introduction tube, a temperature meter, and a reflux condenser, 1000.4 g (7.24 mol) of p-hydroxybenzoic acid, 436.1 g (2.34 mol) of 4,4'-dihydroxybiphenyl, 232.4 g (1.40 mol) of terephthalic acid, 155.5 g (0.94 mol) of isophthalic acid, 1400.3 g (13.72 mol) of acetic anhydride, and 0.194 g of a catalyst (1-methylimidazole) were added and stirred at a room temperature for 15 minutes, and the inside atmosphere of the reactor was sufficiently substituted by a nitrogen gas, followed by heating with stirring. At the inside temperature of 142° C., stirring was conducted while maintaining the temperature for one hour.

After that, while distilling off byproduct acid and non-reacted acetic anhydride, the temperature was raised to 320° C. in 2 hours and 50 minutes, and a prepolymer was obtained with a time point at which a torque increase was confirmed being considered as a termination of the reaction. A flow initiating temperature of the prepolymer was 260° C.

The obtained prepolymer was cooled to a room temperature and then pulverized by rough pulverizer to obtain a powder of liquid-crystalline polyester (particle diameter: about 0.1 mm to about 1 mm), and then the temperature was raised from a room temperature to 250° C. for one hour under a nitrogen atmosphere, followed by raising the temperature from 250° C. to 280° C. for 5 hours, followed by maintaining 280° C. for 3 hours, thereby promoting a polymerizing reaction in a solid layer. A flow initiation temperature of the obtained polyester was 286° C. The obtained polyester is referred to as LCP1.

Examples 1 to 3

The nanostructured hollow-carbon material obtained in Production Example 1 and the liquid-crystalline polymer (LCP1) obtained in Production Example 2 in a composition (i.e., the amount) shown in Table 1 were mixed to obtain a liquid-crystalline polymer composition. The composition was pelletized using a biaxial extruder (PCM-30 manufactured by Ikegai Co. Ltd.) at a cylinder temperature of 300° C. to obtain composition pellets. A flow initiation temperature (Ft: flow temperature) of the composition pellets was measured by the method described above. The obtained flow initiation temperature is shown in Table 1. The composition pellets obtained as described above were dried and subjected to injection molding by using an injection molding machine PS40E-5ASE manufactured by Nissei Plastic Industrial Co., Ltd. at a resin temperature and a tool temperature shown in Table 2 to obtain a mold shrinkage rate measurement test piece and a specific gravity measurement test piece. Evaluation results are shown in Table 2.

Examples 4 to 6

Mold shrinkage rate measurement test pieces were obtained in the same as in Examples 1 to 3, except that each of liquid-crystalline polymer compositions was obtained by mixing not only the nanostructured hollow-carbon material obtained in Production Example 1 and the liquid-crystalline polymer (LCP1) obtained in Production Example 2, but also a milled glass fiber (Milled Fiber-Glass Powder EFH75-01, manufactured by Central Glass Co., Ltd., having a size of 10 μmϕ×75 μm according to the disclosure by the manufacturer). The composition (i.e., the amount) of the hollow-carbon, the liquid-crystalline polymer (LCP1) and the glass fiber are shown in Table 1. Evaluation results are shown in Table 2.

Comparative Example 1

A mold shrinkage rate measurement test pieces were obtained in the same as in Examples 1 to 3, except that the nanostructured hollow-carbon material was not used. Evaluation results are shown in Table 2.

Comparative Examples 2 to 4

A mold shrinkage rate measurement test pieces were obtained in the same as in Examples 4 to 6, except that the nanostructured hollow-carbon material was not used. Evaluation results are shown in Table 2.

TABLE 1

| | Composition (parts by weight) | | | Flow Initiation Temperature (° C.) |
|---|---|---|---|---|
| | LCP1 | Nanostructured Hollow-carbon Material | mGF | |
| Example 1 | 100 | 1.1 | 0 | 280 |
| Example 2 | 100 | 3.1 | 0 | 281 |
| Example 3 | 100 | 5.3 | 0 | 281 |
| Example 4 | 100 | 7.0 | 33.3 | 283 |
| Example 5 | 100 | 7.5 | 42.9 | 283 |
| Example 6 | 100 | 8.8 | 66.7 | 284 |
| Comparative Example 1 | 100 | 0 | 0 | 280 |
| Comparative Example 2 | 100 | 0 | 33.3 | 286 |
| Comparative Example 3 | 100 | 0 | 42.9 | 286 |
| Comparative Example 4 | 100 | 0 | 66.7 | 286 | mGF: Milled glass fiber

TABLE 2

| | Molding Conditions | | Mold Shrinkage Rate (%) | | Anisotropy TD/MD Ratio | Specific Gravity |
|---|---|---|---|---|---|---|
| | Molding Temperature (° C.) | Tool Temperature (° C.) | MD | TD | | |
| Example 1 | 300 | 130 | 0.23 | 1.49 | 6.37 | 1.39 |
| Example 2 | 300 | 130 | 0.24 | 1.55 | 6.45 | 1.40 |
| Example 3 | 300 | 130 | 0.35 | 1.56 | 4.45 | 1.40 |
| Example 4 | 300 | 130 | 0.25 | 1.04 | 4.16 | 1.58 |
| Example 5 | 300 | 130 | 0.24 | 1.00 | 4.17 | 1.62 |
| Example 6 | 300 | 130 | 0.31 | 0.86 | 2.77 | 1.71 |
| Comparative Example 1 | 300 | 130 | 0.08 | 1.63 | 19.93 | 1.39 |
| Comparative Example 2 | 320 | 130 | 0.18 | 1.45 | 8.29 | 1.57 |
| Comparative Example 3 | 320 | 130 | 0.17 | 1.34 | 7.88 | 1.61 |
| Comparative Example 4 | 320 | 130 | 0.16 | 1.18 | 7.38 | 1.70 |

It has found that the liquid-crystalline polymer compositions (Examples 1 to 3) of the present invention, which were composed of the liquid-crystalline polymer and the nanostructured hollow-carbon material, have the small anisotropy of mold shrinkage rate as compared to the liquid-crystalline polymer (Comparative Example 1). Also, it has found that the liquid-crystalline polymer compositions have the small anisotropy of mold shrinkage rate and the small specific gravity as compared to the liquid-crystalline polymer compositions (Comparative Examples 2 to 4) composed of the liquid-crystalline polymer and the glass fiber. Further, it has found that the liquid-crystalline polymer compositions (Examples 4 to 6) of the present invention, which were composed of the liquid-crystalline polymer, the nanostructured hollow-carbon material and glass fiber, have the further smaller anisotropy of mold shrinkage rate without increasing a specific gravity of the articles so much as compared to liquid-crystalline polymer compositions (Comparative Examples 2 to 4) composed of the liquid-crystalline polymer and the glass fiber.

What is claimed is:
1. A molded article obtained from a liquid-crystalline polymer composition comprising a nanostructured hollow-carbon material and a liquid-crystalline polymer, wherein the composition meets the following requirement (A):

(A) the nanostructured hollow-carbon material comprises particles, each particle of which is selected from the group consisting of:

a particle which is composed of a carbon part and a hollow part and has a structure that the hollow part is entirely enclosed by the carbon part; and a particle which is composed of a carbon part and a hollow part and has a structure that the hollow part is partly enclosed by the carbon part.

2. The molded article according to claim 1, wherein the liquid-crystalline polymer composition further meets requirements (B), (C) and (D):

(B) the carbon part of the nanostructured hollow-carbon material has a multilayer structure that is formed of 2 to 1000 layers;

(C) a thickness of the carbon part of the nanostructured hollow-carbon material is within a range of from 1 to 200 nm; and (D) a diameter of the hollow part of the nanostructured hollow-carbon material is within a range of from 0.5 to 900 nm.

3. The molded article according to claim 1, wherein the liquid-crystalline polymer composition, further comprises a glass fiber.

* * * * *